United States Patent
Oishi

(10) Patent No.: US 11,453,340 B2
(45) Date of Patent: Sep. 27, 2022

(54) DISPLAY DEVICE

(71) Applicant: Panasonic Intellectual Property Management Co., Ltd., Osaka (JP)

(72) Inventor: Toshiharu Oishi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 17/029,967

(22) Filed: Sep. 23, 2020

(65) Prior Publication Data

US 2021/0001778 A1    Jan. 7, 2021

Related U.S. Application Data

(63) Continuation of application No. PCT/JP2019/012594, filed on Mar. 25, 2019.

(30) Foreign Application Priority Data

Mar. 29, 2018    (JP) .............................. JP2018-064472

(51) Int. Cl.
*B60R 1/12*    (2006.01)
*G02B 5/30*    (2006.01)
(Continued)

(52) U.S. Cl.
CPC .................. *B60R 1/12* (2013.01); *B60R 1/04* (2013.01); *G02B 5/3025* (2013.01);
(Continued)

(58) Field of Classification Search
CPC ..... B60R 1/04; B60R 1/12; B60R 2001/1253; G02B 5/3025; G02B 5/3083; G02F 1/0136
(Continued)

(56) References Cited

U.S. PATENT DOCUMENTS 7,268,841 B2    9/2007    Kasajima
9,720,281 B2    8/2017    Tsunekawa
(Continued)

FOREIGN PATENT DOCUMENTS

JP    H06-258634 A    9/1994
JP    H11-174497 A    7/1999
(Continued)

OTHER PUBLICATIONS

Office Action issued in Japan Counterpart Patent Appl. No. 2018-064472, dated Oct. 11, 2021, along with an English translation thereof.

(Continued)

*Primary Examiner* — Ricky D Shafer
(74) *Attorney, Agent, or Firm* — Greenblum & Bernstein, P.L.C.

(57) ABSTRACT

A display device includes: a display panel, a reflective polarization plate, a polarization control panel, a polarization plate, and an optical layer arranged in a stated order. The reflective polarization plate transmits a component polarized in the first direction and reflects a component polarized in the second direction, in light incident on the reflective polarization plate. The polarization control panel is switchable between a first state in which light incident on the polarization control panel has its polarization direction changed and is transmitted accordingly and a second state in which the incident light has its polarization direction maintained and is transmitted accordingly. The polarization plate transmits a component polarized in the first direction or a component polarized in the second direction, in light incident on the polarization plate. The optical layer disturbs a polarization direction of light incident on the optical layer and transmits the light accordingly.

14 Claims, 12 Drawing Sheets

(51) Int. Cl.
  *B60R 1/04* (2006.01)
  *G02F 1/01* (2006.01)
  *B60R 11/04* (2006.01)
(52) U.S. Cl.
  CPC ......... *G02B 5/3083* (2013.01); *G02F 1/0136* (2013.01); *B60R 11/04* (2013.01); *B60R 2001/1253* (2013.01); *B60R 2300/8066* (2013.01)
(58) Field of Classification Search
  USPC .............. 359/485.07, 838, 871, 489.07
  See application file for complete search history.

(56) References Cited

U.S. PATENT DOCUMENTS

| | | | |
|---|---|---|---|
| 10,377,312 B2* | 8/2019 | Takada | B60R 1/084 |
| 10,486,601 B2* | 11/2019 | Luten | B60R 1/088 |
| 10,501,017 B2 | 12/2019 | Taguchi | |
| 10,656,415 B2 | 5/2020 | Kuzuhara et al. | |
| 10,824,004 B2* | 11/2020 | Cammenga | B60R 1/12 |
| 11,092,867 B2* | 8/2021 | Kloeppner | G02B 5/3058 |
| 2004/0125430 A1* | 7/2004 | Kasajima | G02F 1/1347 359/247 |
| 2008/0266500 A1* | 10/2008 | Nimura | G02F 1/133634 349/117 |
| 2015/0293390 A1 | 10/2015 | Tsunekawa | |
| 2017/0080868 A1 | 3/2017 | Oishi | |
| 2017/0203693 A1 | 7/2017 | Oishi | |
| 2017/0235176 A1 | 8/2017 | Oishi et al. | |
| 2018/0099614 A1* | 4/2018 | Taguchi | B60R 1/08 |
| 2019/0265470 A1 | 8/2019 | Takase et al. | |
| 2019/0344718 A1* | 11/2019 | Hayden | G02B 27/281 |
| 2019/0359139 A1 | 11/2019 | Taguchi et al. | |

FOREIGN PATENT DOCUMENTS

| | | |
|---|---|---|
| JP | 2012-230390 A | 11/2012 |
| JP | 2014-026058 A | 2/2014 |
| JP | 2014-089270 A | 5/2014 |
| JP | 2014-219632 A | 11/2014 |

OTHER PUBLICATIONS

U.S. Appl. No. 17/080,366 to Imamura et al., filed Oct. 26, 2020.
Official Communication issued in International Bureau of WIPO Patent Application No. PCT/JP2019/012594, dated Jun. 11, 2019, along with an English translation thereof.
Office Action issued in Japanese Counterpart Patent Appl. No. 2018-064472, dated Mar. 15, 2022, along with an English translation thereof.
Office Action issued in Japanese Counterpart Patent Appl. No. 2018-064472, dated May 16, 2022, along with an English translation thereof.

* cited by examiner

DISPLAY DEVICE

BACKGROUND

1. Field

The present disclosure relates to a display device capable of displaying an image and a mirror image by switching between the image and the mirror image.

2. Description of the Related Art

Display devices capable of displaying an image and a mirror image by switching between the image and the mirror image are known (see, for example, patent literature 1). The display device includes a liquid crystal display unit and a display switcher. A reflective polarization plate, a liquid crystal panel, and an absorptive polarization plate are provided in the display switcher in the stated order when viewed from the side of the liquid crystal display unit. In a state in which the liquid crystal panel of the display switcher transmits light without changing the polarization axis of the light, the image on the liquid crystal display unit is displayed. In a state in which the liquid crystal panel transmits light by changing the polarization axis of the light, the incident outside light is reflected by the reflective polarization plate, and the reflected light causes a mirror image to be displayed.

[Patent Literature 1] JP2004-37944

We have recognized that, in the case the display device disclosed in patent literature 1 is mounted in the vehicle interior of a vehicle, unevenness in brightness or unevenness in colors may be observed in the mirror image as a result of outside light being transmitted through a windowpane such as the rear window of the vehicle and incident on the display device. It is desired that such unevenness be reduced.

SUMMARY

The disclosure addresses the above-described issue, and a general purpose thereof is to provide a technology capable of suppressing unevenness in display in a display device capable of displaying an image and a mirror image by switching between the image and the mirror image.

A display device according to an embodiment of the present disclosure includes: a display panel, a reflective polarization plate, a polarization control panel, a polarization plate, and an optical layer arranged in a stated order along a third direction, which is one of a first direction, a second direction, and the third direction that intersect each other. The reflective polarization plate transmits a component polarized in the first direction and reflects a component polarized in the second direction, in light incident on the reflective polarization plate. The polarization control panel is switchable between a first state in which light incident on the polarization control panel has its polarization direction changed and is transmitted accordingly and a second state in which the incident light has its polarization direction maintained and is transmitted accordingly. The polarization plate transmits a component polarized in the first direction or a component polarized in the second direction, in light incident on the polarization plate. The optical layer disturbs a polarization direction of light incident on the optical layer and transmits the light accordingly.

DETAILED DESCRIPTION

The invention will now be described by reference to the preferred embodiments. This does not intend to limit the scope of the present invention, but to exemplify the invention.

First Embodiment

A brief summary will be given before describing the first embodiment in specific details. The first embodiment relates to a display device capable of displaying an image and a mirror image by switching between the image and the mirror image. The display device is a vehicle-mounted display device that can be provided in a vehicle and, specifically, is configured as an electronic mirror used to view the scene behind the vehicle. The display device includes a display panel, a reflective polarization plate, a polarization control panel, and a polarization plate. When an image is displayed, the display panel displays an image captured by a camera provided in the rear part of the vehicle and capturing a field of view behind the vehicle. The image displayed by the display panel is transmitted through the reflective polarization plate, the polarization control panel, and the polarization plate and is viewed by the driver. When a mirror image is displayed, outside light is transmitted through the polarization plate and the polarization control panel, reflected by the reflective polarization plate, and the mirror image produced by the reflected light is viewed by the driver.

The outside light is transmitted through a windowpane such as the rear window of the vehicle and is incident on the polarization plate of the display device. A spatial intensity distribution determined by the position where the light is transmitted through the windowpane is induced in the polarization component of the light transmitted through the windowpane due to the structure of reinforced glass, etc. used in the windowpane. When a mirror image is displayed, the component polarized in one direction and having an intensity distribution is transmitted through the frontward polarization plate of the display device and is reflected by the reflective polarization plate, and the light polarized in the one direction is viewed by the viewer. Since the light polarized in one direction has an intensity distribution, unevenness may be observed in the mirror image. To address this, the display device according to the first embodiment includes a high retardation film provided on the viewer side of the polarization plate, the high retardation film disturbs the polarization direction of the incident light and transmits the light.

In this specification, the terms "panel", "sheet", "film", and "plate" are not distinguished from each other based solely on the difference in designation. For example, the term "plate" encompasses members that can be referred to as films or sheets. Therefore, the term "polarization plate" cannot be distinguished from a member referred to as "polarization film" or "polarization sheet" based solely on the difference in designation.

Figure 1:
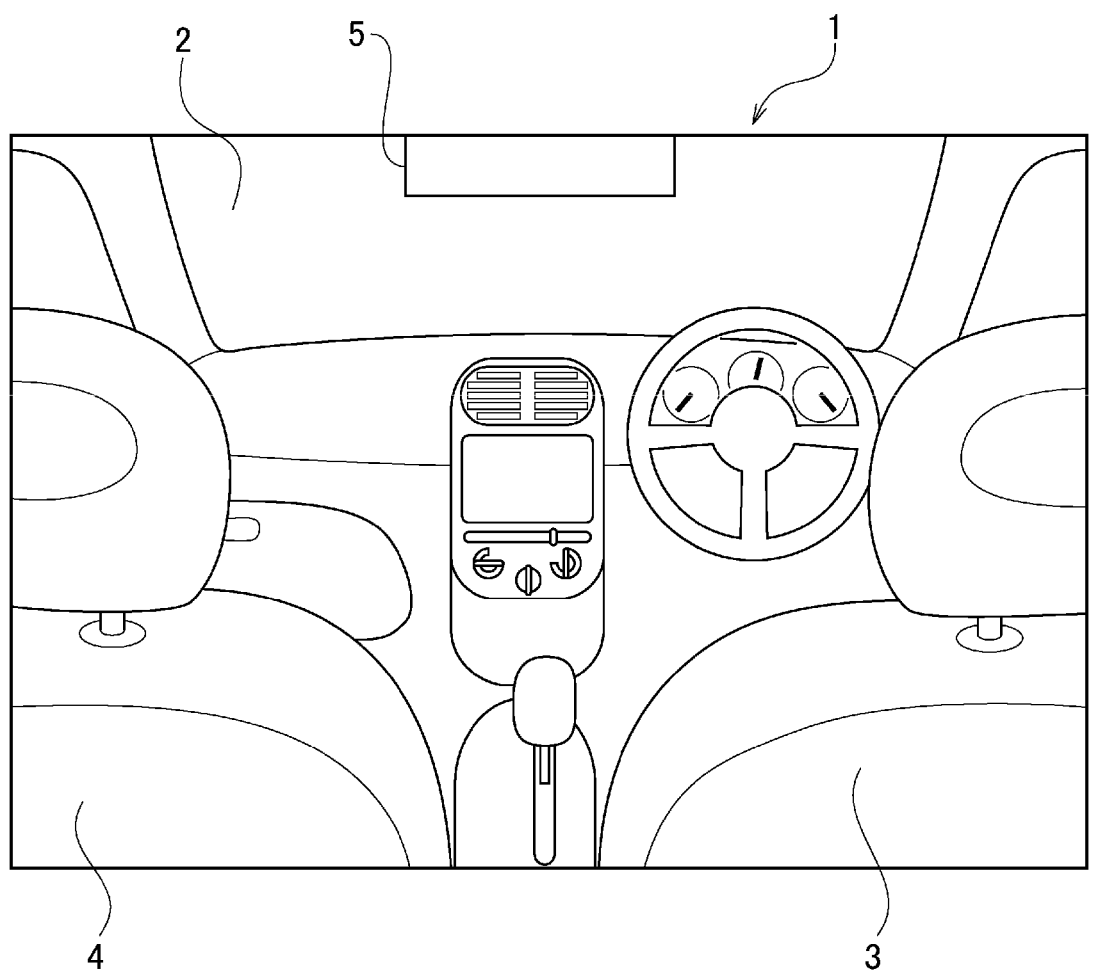
FIG. 1 shows a vehicle interior of a vehicle in which an electronic mirror device according to the first embodiment is mounted.
Figure 2:
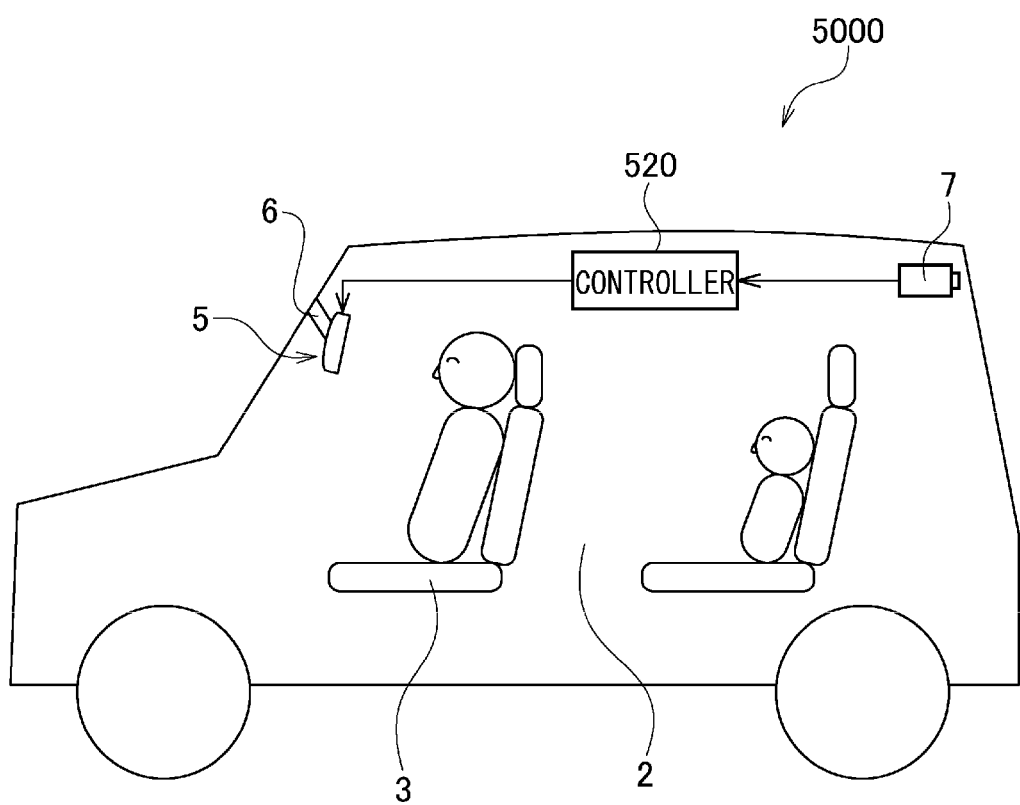
FIG. 2 is a perspective side view schematically showing the vehicle interior of the vehicle of FIG. 1.
Figure 3:
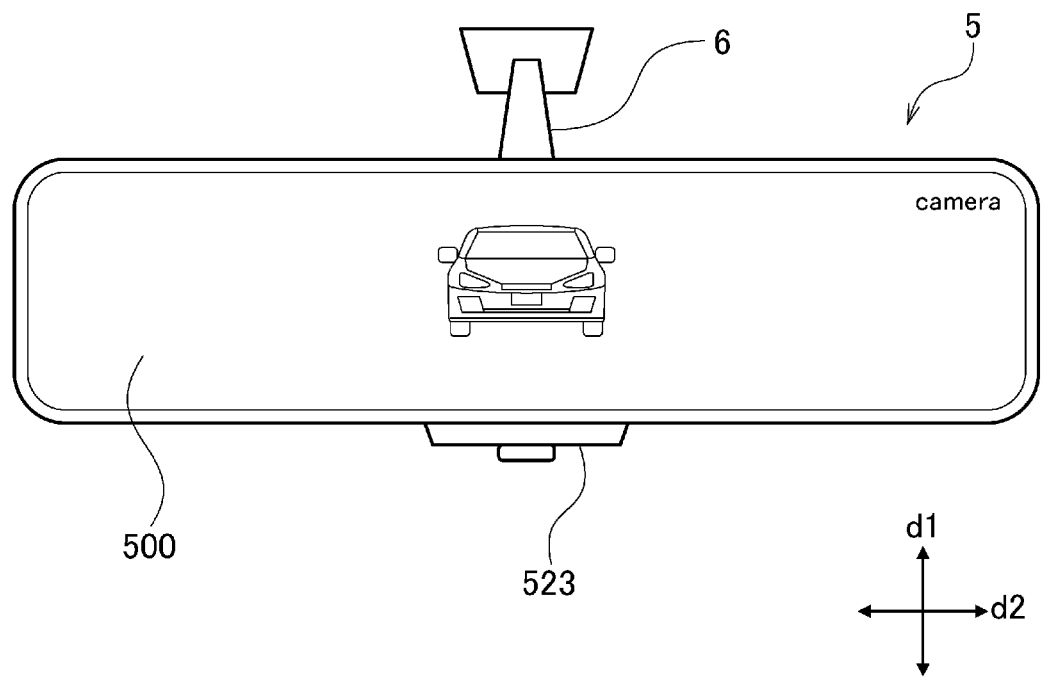
FIG. 3 is a front view of the electronic mirror device of FIG. 1.

FIG. 1 shows a vehicle interior 2 of a vehicle 1 in which an electronic mirror device 5 according to the first embodiment is mounted. FIG. 2 is a perspective side view schematically showing the vehicle interior 2 of the vehicle of FIG. 1. FIG. 3 is a front view of the electronic mirror device 5 of FIG. 1.

As shown in FIG. 2, an electronic mirror system 5000 is mounted in the vehicle 1. The electronic mirror system 5000 includes the electronic mirror device 5, a controller 520, and a camera 7. The electronic mirror device 5 is rotatably attached in the vehicle interior 2 of the vehicle 1 via a mount 6 and is used to view the scene behind the vehicle. The electronic mirror device 5 is mounted to, for example, the front end of the ceiling between a driver's seat 3 and a front passenger seat 4.

The camera 7 is provided in the rear part of the vehicle 1 to obtain an image capturing a field of view behind the vehicle 1 and outputs image data for the obtained image to the controller 520. In accordance with a user operation of the driver in a user operation unit 523 of the electronic mirror device 5, the controller 520 controls the electronic mirror device 5 to display the image obtained by the camera 7 or controls the electronic mirror device 5 to display a mirror image.

Figure 4:
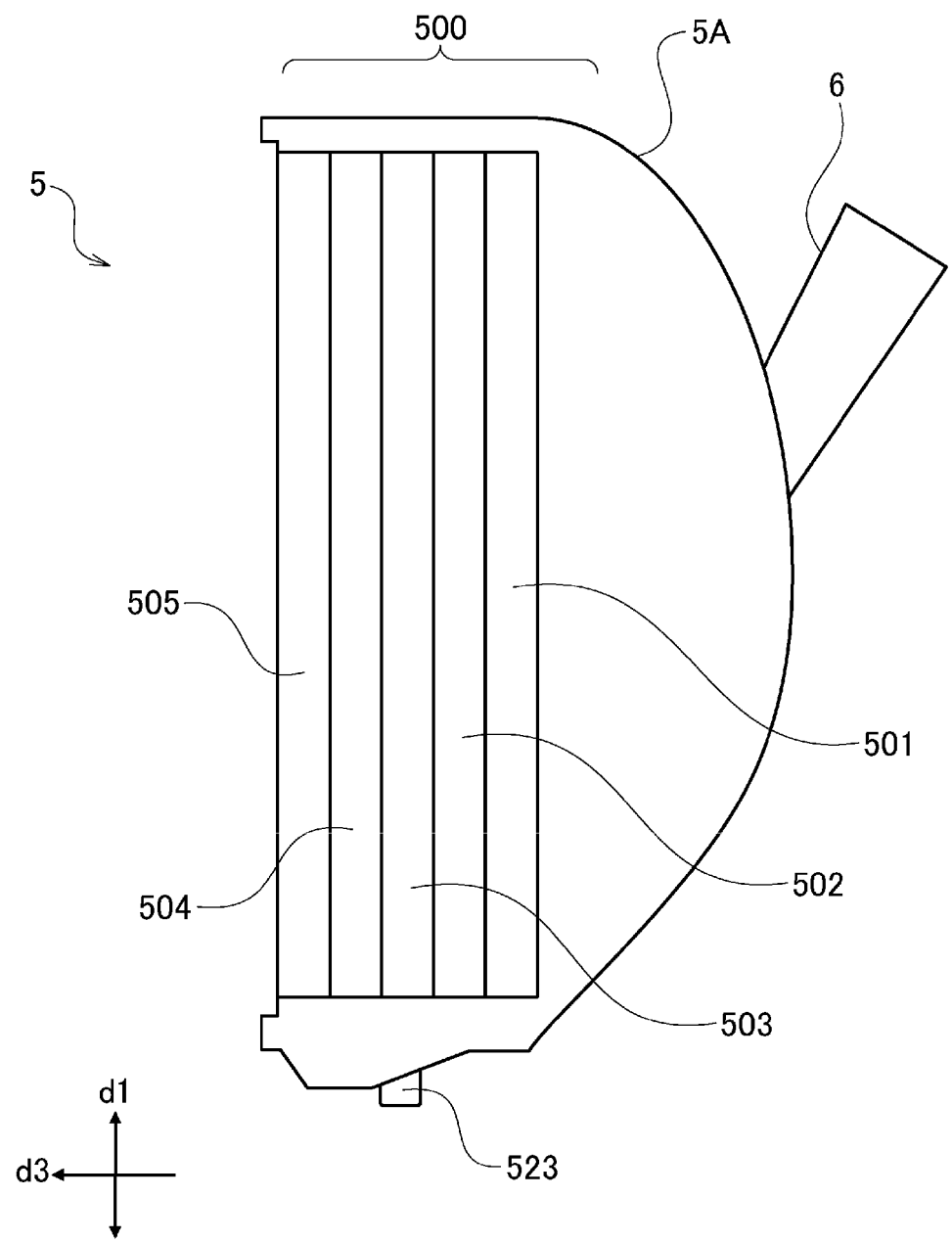
FIG. 4 is longitudinal cross-sectional view of the electronic mirror device of FIG. 1.

FIG. 4 is longitudinal cross-sectional view of the electronic mirror device 5 of FIG. 1. The electronic mirror device 5 includes a main body case 5A, a mount 6, a display device 500, and a user operation unit 523. The main body case 5A has an opening toward the rear part of the vehicle 1. The main body case 5A houses the display device 500.

The display device 500 includes a display panel 501, a reflective polarization plate 502, a polarization control panel 503, a polarization plate 504, and an optical layer 505 arranged in layers in the stated order along a third direction d3, which is one of the first direction d1, a second direction d2, and the third direction d3 that intersect each other. The first direction d1 is the vertical direction (lateral direction) of the display surface of the display device 500. The second direction d2 is the horizontal direction (longitudinal direction) of the display surface of the display device 500. The third direction d3 is a direction normal to the display surface of the display device 500 and is a direction away from the display surface toward the viewer. The first direction d1 through the third direction d3 perpendicularly intersect each other. A transparent base member may be provided adjacent to the optical layer 505 in the third direction d3.

The display panel 501 is, for example, a liquid crystal panel and displays an image obtained by the camera 7 and capturing a field of view behind the vehicle 1. The display panel 501 includes a backlight, a lower polarization plate, a liquid crystal layer, and an upper polarization plate (not shown). The display panel 501 outputs the light transmitted through the upper polarization plate and linearly polarized in the first direction d1. The light linearly polarized in the first direction d1 thus output forms an image. The display panel 501 is based on a publicly known technology, and a description of further details is omitted.

The reflective polarization plate 502 transmits the component linearly polarized in the first direction d1 and reflects the component linearly polarized in the second direction d2, in the light incident on the reflective polarization plate 502. Thus, the direction of the transmission axis of the reflective polarization plate 502 is aligned with the direction of the transmission axis of the upper polarization plate of the display panel 501 and is the first direction d1. The direction of the reflection axis of the reflective polarization plate 502 is the second direction d2.

The polarization control panel 503 is switchable between the first state in which the light incident on the polarization control panel 503 has its polarization direction changed substantially 90° and is transmitted accordingly and the second state in which the incident light has its polarization direction substantially maintained and is transmitted accordingly. In the first state, the polarization control panel 503 changes the polarization direction of the incident light from the first direction d1 to the second direction d2 and changes the polarization direction of the incident light from the second direction d2 to the first direction d1.

The polarization control panel 503 is comprised of, for example, a liquid crystal panel. The liquid crystal panel is formed by sandwiching a liquid crystal layer between two transparent substrates (not shown). A transparent electrode is provided in each of the two transparent substrates, and the transparent electrode can apply a voltage to the liquid crystal layer. For example, the transparent electrode is configured to cover the effective display region substantially entirely. For example, the polarization control panel 503 is placed in the first state when a voltage is not applied and is placed in the second state when a voltage is applied.

The polarization plate 504 is a linear polarization plate that transmits the component of the light incident on the polarization plate 504 linearly polarized in the first direction d1 and absorbs the component of the incident light linearly polarized in the second direction d2. Thus, the direction of the transmission axis of the polarization plate 504 is aligned with the direction of the transmission axis of the reflective polarization plate 502 and is the first direction d1. The direction of the absorption axis of the polarization plate 504 is the second direction d2.

The direction of the absorption axis of the polarization plate 504 is aligned with the horizontal direction of the vehicle 1. The direction of the absorption axis of the polarization plate 504 may not be identical to the horizontal direction of the vehicle 1. It is preferred that the angle formed by the direction of the absorption axis of the polarization plate 504 and the horizontal direction of the vehicle 1 be as small as possible. The angle is preferably 15° or smaller, and, more preferably, 5° or smaller.

The optical layer 505 disturbs the polarization state, including the polarization direction, of light incident on the optical layer 505, before transmitting the incident light. The optical layer 505 includes an optical film having retardation of 3000 nm-15000 nm. In this case, the optical layer 505 is an optical film. An optical film like this is referred to as a high-retardation film. It is preferred that retardation is 4000 nm or more, and, more preferably, 5000 nm or more. Retardation may be 15000 nm or less, considering the manufacturing efficiency, difficulty to make the film thin, and the risk of tearing easily. In the case of retardation in excess of 15000 nm, the manufacturing efficiency may be lowered, the difficulty to make a thin film may increase, and the film may tear easily.

The optical film may be a stretched film manufactured by stretching. In that case, the angle formed by the absorption axis of the polarization plate 504 and the direction of stretch of the optical film may be about 45°. The direction of stretch of the optical film is the direction of the slow axis of the optical film. The angle can be appropriately adjusted as needed. The angle is preferably 30-60°, and, more preferably, 40-50°.

Figure 5:
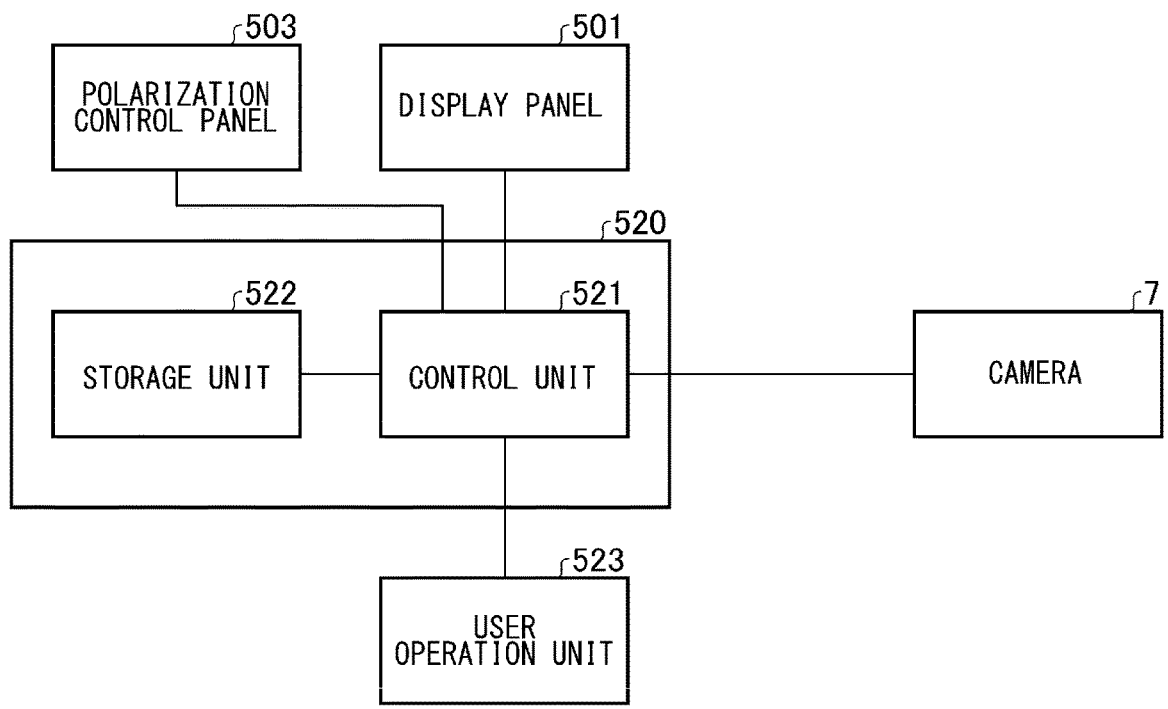
FIG. 5 is a block diagram of the electronic mirror system of FIG. 2.

FIG. 5 is a block diagram showing the detail of the electronic mirror system 5000 of FIG. 2. The controller 520 includes a control unit 521 and a storage unit 522. The camera 7 outputs image data for the obtained image to the control unit 521. When a user operation to display an image is performed in the user operation unit 523, the control unit 521 supplies the image data from the camera 7 to the display panel 501 to display the image and controls the polarization control panel 503 to be in the second state, in accordance with an operation program stored in the storage unit 522. This causes the electronic mirror device 5 to display the image obtained by the camera 7. When a user operation to display a mirror image is performed in the user operation unit 523, the control unit 521 does not cause the display panel 501 to display the image and controls the polarization control panel 503 to be in the first state. This causes the electronic mirror device 5 to display the mirror image.

A description will now be given of the overall operation of the display device 500 having the configuration described above.

Figure 6:
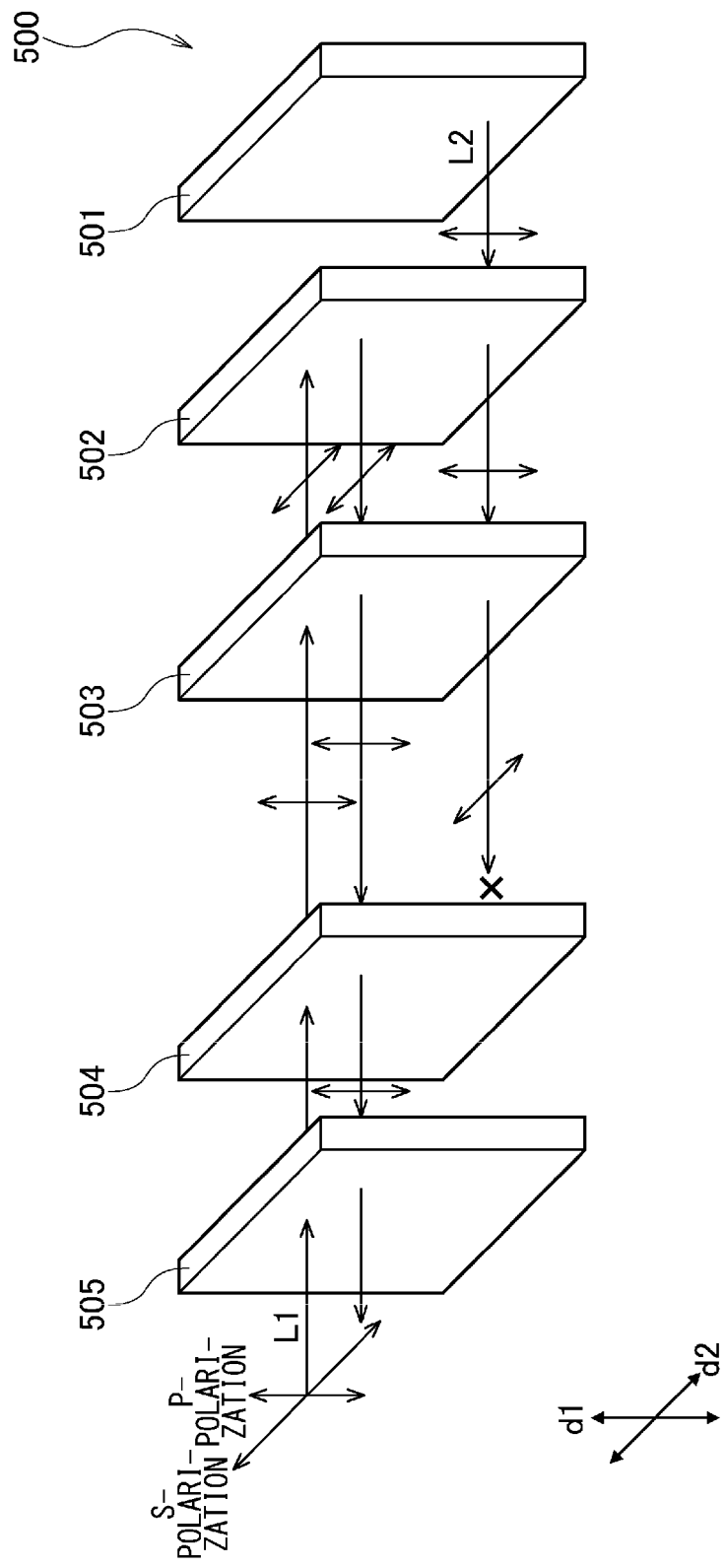
FIG. 6 shows an operation of the display device of FIG. 4 performed when it displays a mirror image.

FIG. 6 shows an operation of the display device 500 of FIG. 4 performed when it displays a mirror image. For clarification, FIG. 6 shows constituting elements spaced apart from each other.

Sunlight reflected by the road surface, water surface, front windshield of a vehicle behind may be incident on the display device 500. The S-polarization component of the reflected light like this is more intense than the P-polarization component thereof. The direction of the electric field of the S-polarization component is aligned with the horizontal direction of the vehicle 1.

Further, a spatial intensity distribution is induced in the polarization component of the outside light transmitted through the windowpane of the vehicle 1 in accordance with the position where the light is transmitted through the windowpane. It can therefore be predicted that the S-polarization component incident at the first position on the optical layer 505 is more intense than the S-polarization component incident at the second position, and the P-polarization component incident at the first position is less intense than the P-polarization component incident at the second position.

The optical layer 505 disturbs the polarization state, including the polarization direction, of the incident light L1 and transmits the light L1 toward the polarization plate 504. This ensures that the light incident at the first position can have the S-polarization component thereof weakened and have the P-polarization component thereof intensified and is transmitted through the optical layer 505 accordingly. The light incident at the second position can have the S-polarization component thereof intensified and have the P-polarization component thereof weakened and is transmitted through the optical layer 505 accordingly. Consequently, the intensity of the P-polarization component transmitted at the first position could approach the intensity of the P-polarization component transmitted at the second position. Thus, disturbance of the polarization direction is expected to reduce the intensity distribution of the polarization component of the light incident on the polarization plate 504.

In the case the sunlight reflected by the road surface, etc. is incident, it is predicted that the S-polarization component of the light transmitted through the optical layer 505 is more intense than the P-polarization component thereof.

Of the light incident on the polarization plate 504, the component polarized in the second direction d2, i.e., the S-polarization light is absorbed by the polarization plate 504, and the component polarized in the first direction d1, i.e., the P-polarization light is transmitted through the polarization plate 504. The light polarized in the first direction d1 thus transmitted has its polarization direction changed by the polarization control panel 503 in the first state to the second direction d2. The light polarized in the second direction d2 is reflected by the reflective polarization plate 502 and has its polarization direction changed by the polarization control panel 503 to the first direction d1. The light polarized in the first direction d1 is transmitted through the polarization plate 504, has its polarization direction disturbed by the optical layer 505, and is output toward the viewer. This allows the viewer to view a mirror image of the scene behind the vehicle 1. Since the intensity distribution of the polarization component of the outside light incident on the polarization plate 504 is reduced, unevenness in brightness or unevenness in colors of the mirror image can be suppressed. Further, since the S-polarization light that is relatively intense is absorbed by the polarization plate 504 and the mirror image is primarily formed by the P-polarization light, glare experienced by the viewer is lessened, and the viewability of the mirror image can be improved.

It is assumed that the display panel 501 operates falsely to display a certain image. The light L2 component polarized in the first direction d1 that is output from the display panel 501 to form the image is transmitted through the reflective polarization plate 502 and has its polarization direction changed by the polarization control panel 503 to the second direction d2. The light polarized in the second direction d2 is absorbed by the polarization plate 504 and is not output toward the viewer. For this reason, the image on the display panel 501 is inhibited from being overlaid on the mirror image and viewed, in the event that a false operation of the display panel 501 occurs while the mirror image is being displayed.

Figure 7:
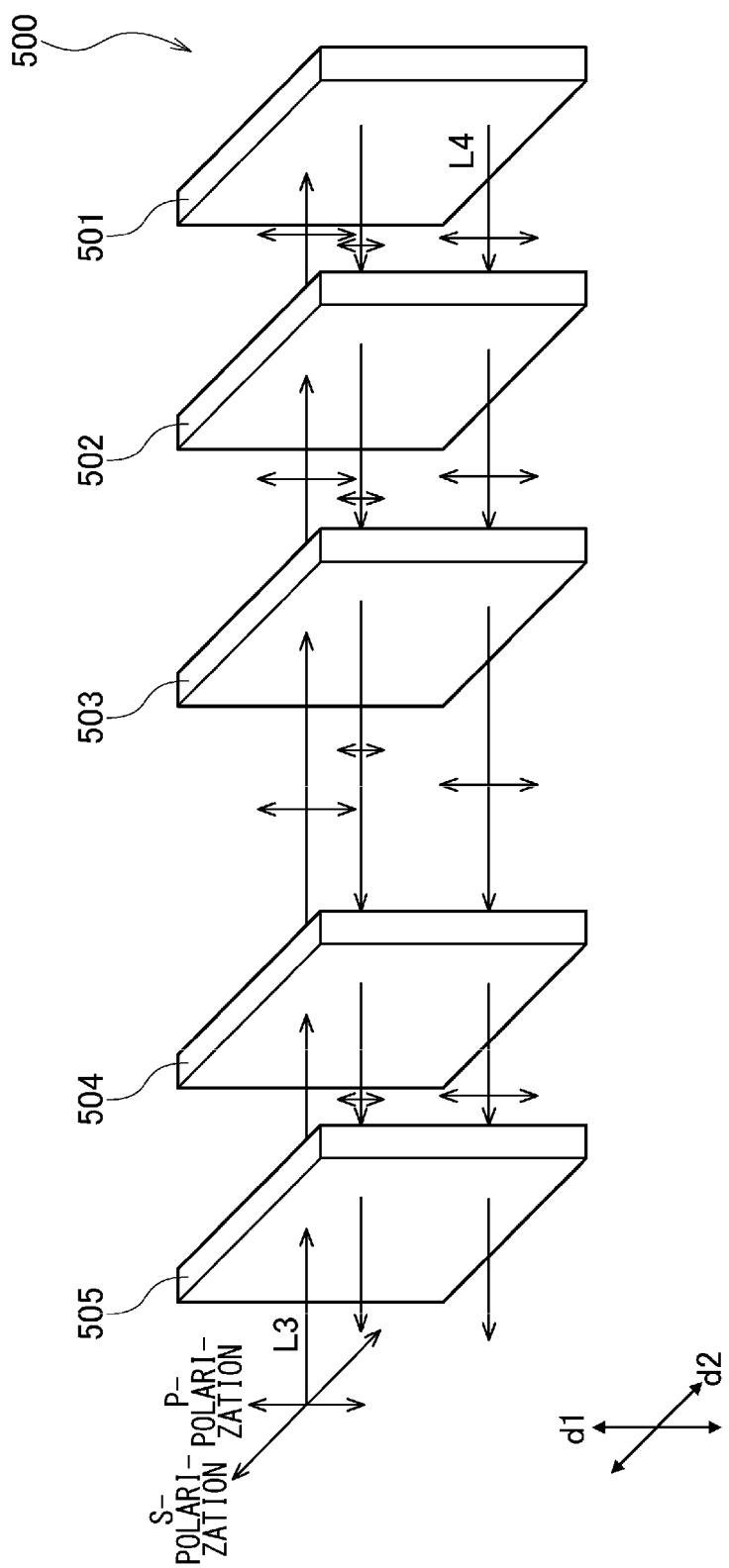
FIG. 7 shows an operation of the display device of FIG. 4 performed when it displays an image.

FIG. 7 shows an operation of the display device 500 of FIG. 4 performed when it displays an image. The light L4 polarized in the first direction d1 that is output from the display panel 501 to form the image is transmitted through the reflective polarization plate 502, the polarization control panel 503 in the second state, and the polarization plate 504, maintaining the polarization direction. The light L4 has its polarization direction disturbed by the optical layer 505 before being output toward the viewer. This allows the viewer to view the image displayed on the display panel 501.

Meanwhile, the incident light L3 from outside light has its polarization direction disturbed by the optical layer 505 and is incident on the polarization plate 504. The light transmitted through the polarization plate 504 and polarized in the first direction d1 is transmitted through the polarization control panel 503 and the reflective polarization plate 502, maintaining the polarization direction, and is reflected by the display panel 501. The intensity of the light reflected by the display panel 501 is reduced to, for example, about several percent of the intensity of the incident light L3. The reflected light is transmitted through the reflective polarization plate 502, the polarization control panel 503, the polarization plate 504, and the optical layer 505, maintaining the first direction d1 as the polarization direction, and is output toward the viewer. The intensity of the reflected light like this is sufficiently smaller than the intensity of the image light so that the ghost from the reflected light is hardly viewed.

According to the embodiment, the optical layer 505 disturbs the polarization state, including the polarization direction, of the incident light transmitted through the windowpane of the vehicle 1. Therefore, the intensity distribution of the polarization component incident on the polarization plate 504 can be reduced. Accordingly, unevenness in display can be suppressed.

Further, the angle formed by the absorption axis of the polarization plate 504 and the direction of stretch of the optical film is about 45° so that the magnitude with which the polarization direction of the incident light is disturbed can be increased.

Further, since the direction of the absorption axis of the polarization plate 504 is aligned with the horizontal direction of the vehicle 1, the S-polarization component of the sunlight reflected by the road surface, water surface, front windshield of a vehicle behind can be absorbed by the polarization plate 504. Therefore, glare is suppressed, and the viewability of the image and the mirror image can be improved.

Assuming a comparative example in which the direction of the absorption axis of the polarization plate 504 is orthogonal to the horizontal direction, on the other hand, the S-polarization component is viewed by the viewer. Therefore, the viewer may experience glare, and the viewability of the image and the mirror image may be reduced.

Variation of First Embodiment

In place of the optical film according to the first embodiment, the optical layer 505 may include a retardation film having retardation of less than 3000 nm. In this variation, the optical layer 505 is a retardation film. The retardation film is a stretched film. In this case, the angle formed by the absorption axis of the polarization plate 504 and the direction of stretch of the retardation film is about 45°. The direction of stretch of the retardation film is the direction of the slow axis of the retardation film. The angle can be appropriately adjusted as needed. The angle is preferably 30-60°, and, more preferably, 40-50°. The retardation film is based on the publicly known technology, and a description of further details is omitted. The configuration described above can equally disturb the polarization direction of the incident light. Therefore, unevenness in display can be suppressed.

Second Embodiment

The second embodiment differs from the first embodiment in that the optical layer 505 includes polarizing and scattering particles in place of the optical film. The following description highlights the difference from the first embodiment.

Figure 8:
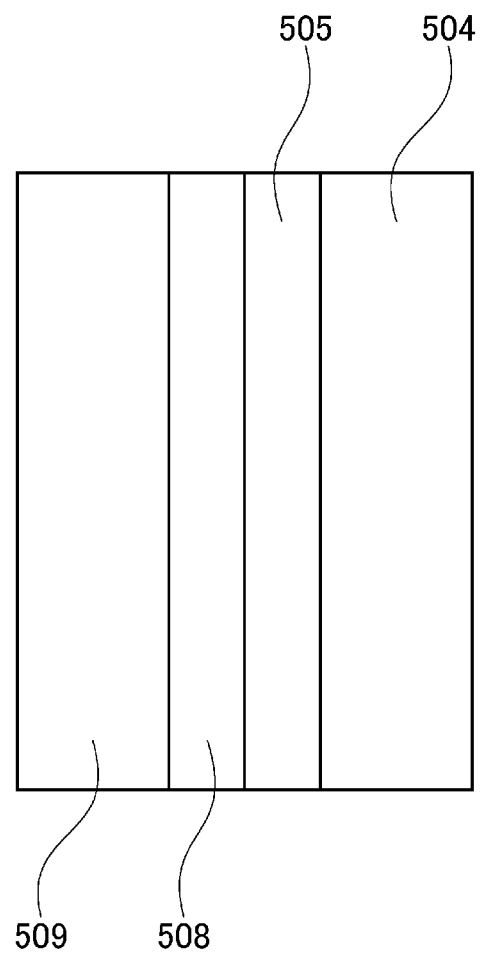
FIG. 8 is a longitudinal cross-sectional view of a part of the display device according to the second embodiment.

FIG. 8 is a longitudinal cross-sectional view of a part of the display device 500 according to the second embodiment. FIG. 8 shows a configuration including the polarization plate 504 and the elements closer to the viewer, the other elements being omitted from the illustration. The optical layer 505 includes polarizing and scattering particles that disturb the polarization direction of the incident light. The optical layer 505 may be formed by coating the polarization plate 504 with an acrylic lacquer containing polarizing and scattering particles and by curing the lacquer.

Polarizing and scattering particles are also called depolarization particles and can depolarize light. Porous fine particles having a spherocrystal structure comprised of polyamide can be used as polarizing and scattering particles. The porous fine particles are structured such that folds that exhibit birefringence are grown in various directions. The particles also have light diffusion capability. Therefore, the particles can depolarize visible light over a wide range of wavelength. Publicly known particles disclosed in, for example, a reference document (JP2014-219632, etc.) may be used as the porous fine particles.

It is preferred that the haze value of the optical layer 505 be equal to or smaller than 10%. This can inhibit the viewability of the image and the mirror image from being lowered. The haze value may be measured by a method in compliance with JISK7136, using the haze meter "HM-150" (from Murakami Color Research Laboratory).

It is preferred that the depolarization factor of the optical layer 505 be equal to or larger than 0.02. This suppresses unevenness in display more successfully. The depolarization factor is defined by the following expression 1.

Depolarization factor=$(LC1-LC2)/(LP2+LC2)$ (expression 1)

LC1 denotes the brightness of cross Nicols that results when the optical layer 505 is used and can be calculated as follows. The optical layer 505 is sandwiched between two linear polarization plates and is arranged such that the absorption axes of the respective linear polarization plates are orthogonal to each other in the sandwiched state. The optical layer 505 is rotated while one of the linear polarization plates is irradiated by a white parallel light perpendicular thereto. The optical layer 505 is fixed at an angle that results in the smallest amount of light transmitted, and the front brightness is measured. The front brightness thus measured is denoted by LC1.

LC2 denotes the brightness of cross Nicols that results when the optical layer 505 is not used. The optical layer 505 is removed in the state in which the front brightness LC1 is measured. The front brightness is then measured, and the front brightness thus measured is denoted by LC2.

LC2 denotes the brightness of parallel Nicols that results when the optical layer 505 is not used. The relative positions of the two linear polarization plates in the state in which the front brightness LC2 is measured are changed so that the absorption axes are parallel to each other. The front brightness is measured, and the front brightness thus measured is denoted by LP2.

A transparent bonding layer 508 is provided on the side of the optical layer 505 opposite to the polarization plate 504. The transparent bonding layer 508 is, for example, an optically clear adhesive (OCA). The transparent bonding layer 508 bonds the optical layer 505 and a transparent base 509.

The transparent base 509 is provided on the side of the transparent bonding layer 508 opposite to the optical layer 505. The transparent base 509 can be made of, for example, glass, polyethylene terephthalate (PET), acryl (PMMA), polycarbonate (PC), etc.

According to this embodiment, as in the case of the first embodiment, the optical layer 505 disturbs the polarization direction of the incident light transmitted through the windowpane of the vehicle 1 so that unevenness in display can be suppressed.

The optical layer 505 may be made of an OCA that contains polarizing and scattering particles. In this case, the optical layer 505 bonds the polarization plate 504 and the transparent base 509. The transparent bonding layer 508 is not necessary.

Third Embodiment

The third embodiment differs from the first embodiment in that the display panel 501 and the reflective polarization plate 502 are bonded by a transparent bonding layer. The following description highlights the difference from the first embodiment.

Figure 9:
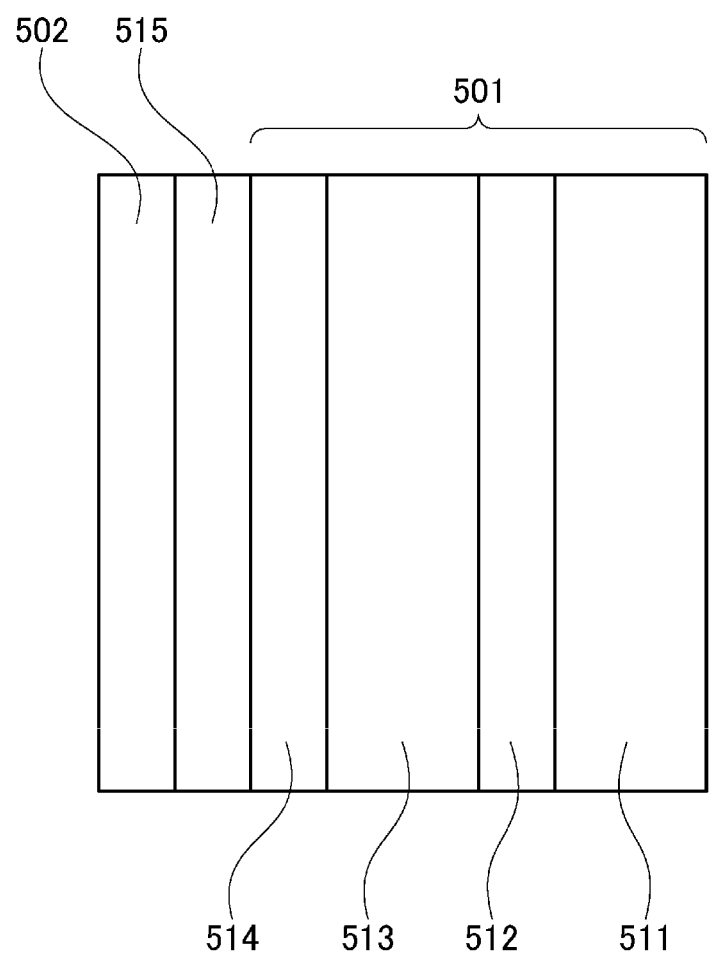
FIG. 9 is a longitudinal cross-sectional view of a part of the display device according to the third embodiment.

FIG. 9 is a longitudinal cross-sectional view of a part of the display device 500 according to the third embodiment. In FIG. 9, the polarization control panel 503 and the elements closer to the viewer are omitted from the illustration. The display device 500 includes a transparent bonding layer 515 in addition to the features of the first embodiment. The display panel 501 includes a backlight 511, a lower polarization plate 512, a liquid crystal layer 513, and an upper polarization plate 514.

The transparent bonding layer 515 bonds the display panel 501 and the reflective polarization plate 502. More specifically, the transparent bonding layer 515 is provided between the upper polarization plate 514 and the reflective polarization plate 502 and bonds the upper polarization plate 514 and the reflective polarization plate 502. The transparent bonding layer 515 is, for example, an OCA.

According to this embodiment, the interface between the reflective polarization plate 502 and the air and the interface between the display panel 501 and the air can be eliminated between the reflective polarization plate 502 and the display panel 501. Therefore, reflection of outside light on the upper polarization plate 514 of the display panel 501 can be reduced when an image is displayed. Accordingly, a mirror image is inhibited from being viewed more successfully when an image is displayed.

Fourth Embodiment

The fourth embodiment differs from the first embodiment in that the upper polarization plate of the display panel 501 is omitted. The following description highlights the difference from the first embodiment.

Figure 10:
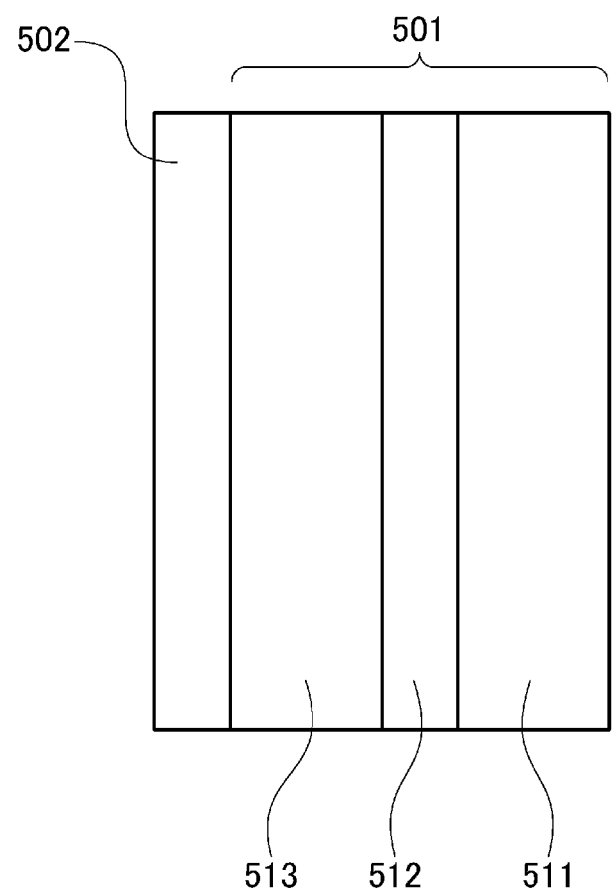
FIG. 10 is a longitudinal cross-sectional view of a part of the display device according to the fourth embodiment.

FIG. 10 is a longitudinal cross-sectional view of a part of the display device 500 according to the fourth embodiment. In FIG. 10, the polarization control panel 503 and the elements closer to the viewer are omitted from the illustration. The display panel 501 includes a backlight 511, a lower polarization plate 512, and a liquid crystal layer 513 and does not include an upper polarization plate.

The reflective polarization plate 502 is provided on the side of the liquid crystal layer 513 opposite to the lower polarization plate 512. A linear polarization plate is not disposed between the reflective polarization plate 502 and the liquid crystal layer 513. In other words, the reflective polarization plate 502 also serves as the upper polarization plate of the display panel 501.

According to this embodiment, the polarization plate of the display panel 501 can be omitted so that the number of components can be reduced.

Fifth Embodiment

The fifth embodiment differs from the first embodiment in that the reflective polarization plate 502 includes a circular polarization reflection layer. The following description highlights the difference from the first embodiment.

Figure 11:
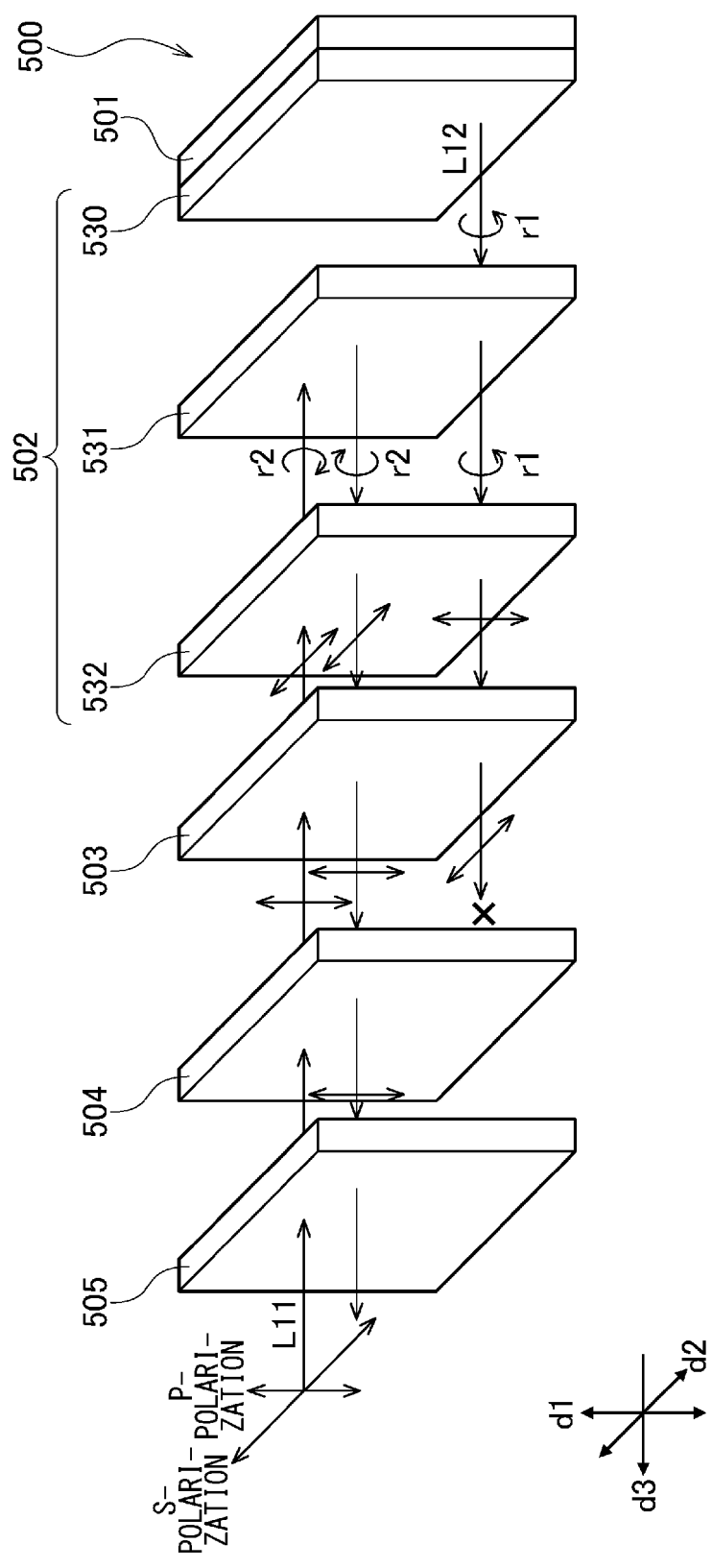
FIG. 11 shows an operation performed by the display device according to the fifth embodiment when it displays a mirror image.

FIG. 11 shows an operation performed by the display device 500 according to the fifth embodiment when it displays a mirror image. For clarification, FIG. 11 shows constituting elements spaced apart from each other. In the display device 500, the reflective polarization plate 502 includes a first wave plate 530, a circular polarization reflection layer 531, and a second wave plate 532 arranged in the stated order along the third direction when viewed from the side of the display panel 501.

The first wave plate 530 is a ¼ wavelength plate and transforms the component of the light incident on the first wave plate 530 linearly polarized in the first direction d1 into a component circularly polarized in a first rotational direction r1 and transmits the resultant light. It is assumed here that the first rotational direction r1 is left rotation.

The circular polarization reflection layer 531 includes a cholesteric liquid crystal layer that reflects visible light selectively. The circular polarization reflection layer 531 transmits the component circularly polarized in the first rotational direction r1 and reflects the component circularly polarized in a second rotational direction r2 opposite to the first rotational direction r1, in the light incident on the circular polarization reflection layer 531. It is assumed here that the second rotational direction r2 is right rotation.

The second wave plate 532 is a ¼ wavelength plate and transforms the component of the light incident on the second wave plate 532 circularly polarized in the first rotational direction r1 into a component linearly polarized in the first direction d1 and transmits the resultant light. The second wave plate 532 transforms the component of the incident light circularly polarized in the second rotational direction r2 into a component linearly polarized in the second direction d2 and transmits the resultant light.

In this embodiment, as in the foregoing embodiments, the reflective polarization plate 502 transmits the component linearly polarized in the first direction d1 and reflects the component linearly polarized in the second direction d2, in the incident light.

A description will now be given of the operation of the display device 500. When a mirror image is displayed, the incident light L11 is transmitted through the optical layer 505, the polarization plate 504, and the polarization control panel 503 in the first state, as in the first embodiment, and is turned into light linearly polarized in the second direction d2. The light linearly polarized in the second direction d2 is transformed by the second wave plate 532 into light circularly polarized in the second rotational direction r2. The component circularly polarized in the second rotational direction r2 is reflected by the circular polarization reflection layer 531. The reflected light is also a component circularly polarized in the second rotational direction r2 and is transformed by the second wave plate 532 into a component linearly polarized in the second direction d2. As in the first embodiment, the light linearly polarized in the second direction d2 has its polarization direction changed by the polarization control panel 503 to the first direction d1. The light linearly polarized in the first direction d1 is transmitted through the polarization plate 504 and the optical layer 505 and is output toward the viewer. This allows the viewer to view a mirror image of the scene behind the vehicle 1. As in the first embodiment, the optical layer 505 suppresses unevenness in brightness or unevenness in colors of the mirror image. Further, the polarization plate 504 lessens glare experienced by the viewer and improves the viewability of the mirror image.

When the display panel 501 operates falsely to display a certain image, the light (not shown) linearly polarized in the first direction d1 that is output from the display panel 501 to form the image is transformed by the first wave plate 530 into light L12 circularly polarized in the first rotational direction r1. The light L12 is transmitted through the circular polarization reflection layer 531 and is transformed by the second wave plate 532 into light linearly polarized in the first direction d1. The light linearly polarized in the first direction d1 has its polarization direction changed by the polarization control panel 503 to the second direction d2. The light linearly polarized in the second direction d2 is absorbed by the polarization plate 504 and is not output toward the viewer. For this reason, the image on the display panel 501 is inhibited from being overlaid on the mirror image and viewed, in the event that a false operation of the display panel 501 occurs while the mirror image is being displayed.

Figure 12:
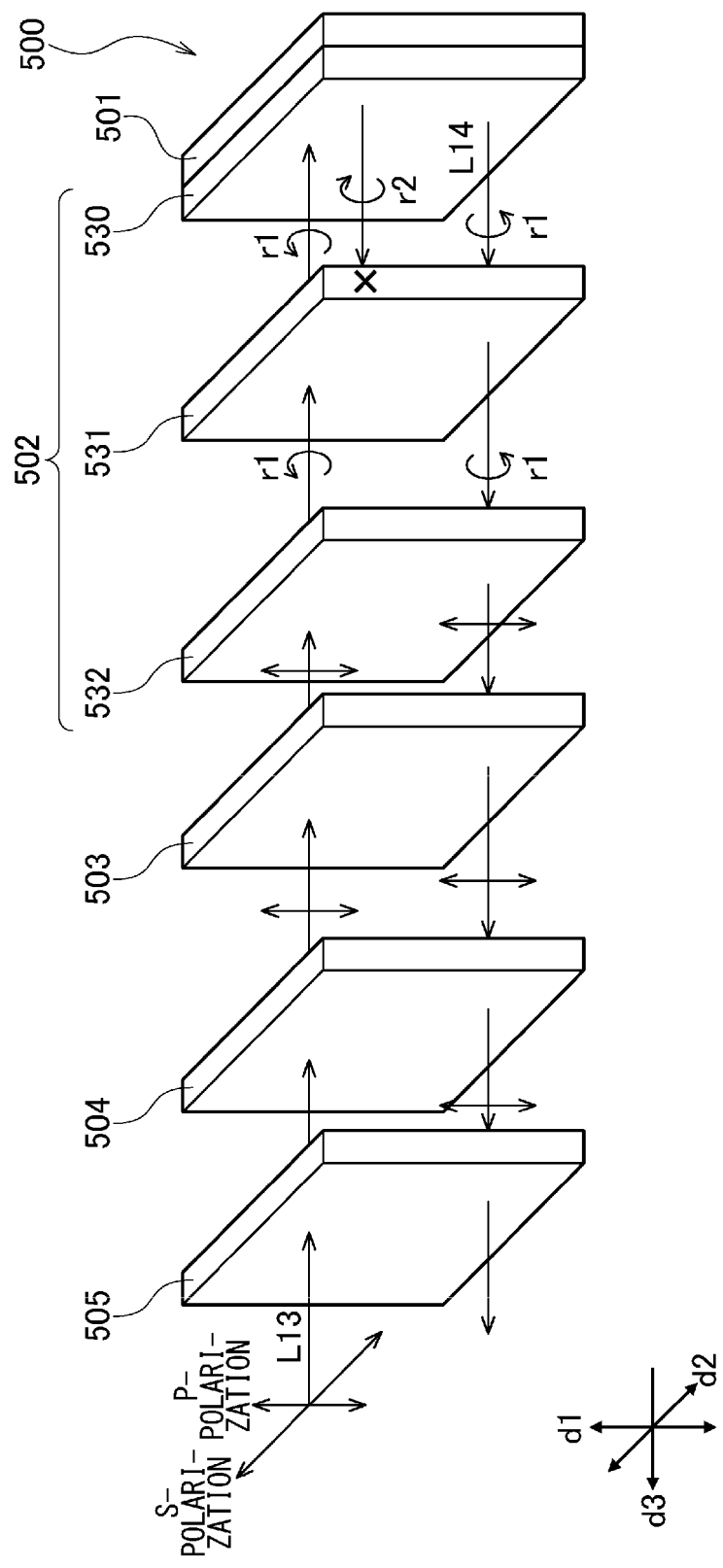
FIG. 12 shows an operation performed by the display device of FIG. 11 when it displays an image.

FIG. 12 shows an operation performed by the display device 500 according to the fifth embodiment when it displays an image. The light (not shown) linearly polarized in the first direction d1 that is output from the display panel 501 to form the image is transformed by the first wave plate 530 into light L14 circularly polarized in the first rotational direction r1. The light L14 is transmitted through the circular polarization reflection layer 531 and is transformed by the second wave plate 532 into light linearly polarized in the first direction d1. The light linearly polarized in the first direction d1 is transmitted through the polarization control panel 503 in the second state, the polarization plate 504, and the optical layer 505, maintaining the polarization direction, and is output toward the viewer. This allows the viewer to view the image displayed on the display panel 501.

Meanwhile, the incident light L13 from outside light is transmitted through the optical layer 505 and is incident on the polarization plate 504. The light transmitted through the polarization plate 504 and linearly polarized in the first direction d1 is transmitted through the polarization control panel 503 and is transformed by the second wave plate 532 into light circularly polarized in the first rotational direction r1. The light is transmitted through the circular polarization reflection layer 531, and a portion thereof is reflected by the surface of the first wave plate 530 and is turned into light circularly polarized in the second rotational direction r2. The light is reflected by the circular polarization reflection layer 531 and does not reach the viewer. For this reason, the ghost from the reflected light is more successfully inhibited from being viewed when an image is displayed than in the first embodiment. Further, the other advantages of the first embodiment can also be provided.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

For example, the first embodiment through the fifth embodiment may be configured to display an image when the polarization control panel 503 is in the first state and to display a mirror image when the polarization control panel 503 is in the second state. In this case, the first direction and the second direction may be reversed so that the first direction is the horizontal direction (longitudinal direction) of the display surface of the display device 500, and the second direction is the vertical direction (lateral direction) of the display surface of the display device 500. Further, the polarization plate 504 is configured to transmit the component polarized in the second direction and absorbs the component polarized in the first direction. In other words, the direction of the absorption axis of the polarization plate 504 is aligned with the horizontal direction of the vehicle 1 in this case, too. In this variation, the flexibility of the configuration of the electronic mirror system 5000 can be improved.

In the second embodiment, the transparent base 509 may be an optical film according to the first embodiment having retardation of 3000 nm-15000 nm or a retardation film having retardation of less than 3000 nm. In this case, the angle formed by the absorption axis of the polarization plate 504 and the slow axis (direction of stretch) of the retardation film is about 45°. In this variation, the magnitude of disturbance of the polarization direction of the incident light can be increased.

In the fifth embodiment, the first rotational direction r1 may be right rotation, and the second rotational direction may be left rotation. In this case, too, the first wave plate 530, the circular polarization reflection layer 531, and the second wave plate 532 may be configured such that the reflective polarization plate 502 transmits the component linearly polarized in the first direction d1 and reflects the component linearly polarized in the second direction d2, in the incident light. In this variation, the flexibility of the configuration of the display device 500 can be improved.

The third embodiment may be combined with the variation of the first embodiment, the second or fifth embodiment so that the display panel 501 and the reflective polarization plate 502 are bonded by the transparent bonding layer 515. The fourth embodiment may be combined with the variation of the first embodiment, the second or fifth embodiment so that the upper polarization plate of the display panel 501 is omitted. The fifth embodiment may be combined with the variation of the first embodiment or the second embodiment so that the reflective polarization plate 502 includes the circular polarization reflection layer 531. A new embodiment created by a combination will provide the combined advantages of the embodiments as combined.

A display device according to an embodiment of the present disclosure includes: a display panel, a reflective polarization plate, a polarization control panel, a polarization plate, and an optical layer arranged in a stated order along a third direction, which is one of a first direction, a second direction, and the third direction that intersect each other, wherein the reflective polarization plate transmits a component polarized in the first direction and reflects a component polarized in the second direction, in light incident on the reflective polarization plate, the polarization control panel is switchable between a first state in which light incident on the polarization control panel has its polarization direction changed and is transmitted accordingly and a second state in which the incident light has its polarization direction maintained and is transmitted accordingly, the polarization plate transmits a component polarized in the first direction or a component polarized in the second direction, in light incident on the polarization plate, and the optical layer disturbs a polarization direction of light incident on the optical layer and transmits the light accordingly.

According to this embodiment, the optical layer disturbs the polarization direction of the incident light so that the intensity distribution of the polarization component incident on the polarization plate 504 can be reduced. Accordingly, unevenness in display can be suppressed.

In the display device according to an embodiment of the present disclosure, the optical layer may include an optical film having retardation of 3000 nm-15000 nm.

In this case, the polarization direction of the incident light can be disturbed.

In the display device according to an embodiment of the present disclosure, the optical film may be a stretched film, and an angle formed by an absorption axis of the polarization plate and a direction of stretch of the optical film may be about 45°.

In this case, the magnitude with which the polarization direction of the incident light is disturbed can be increased.

In the display device according to an embodiment of the present disclosure, the optical layer may include a retardation film that is a stretched film, and an angle formed by an absorption axis of the polarization plate and a direction of stretch of the retardation film may be about 45°. In this case, the polarization direction of the incident light can be disturbed.

In the display device according to an embodiment of the present disclosure, the optical layer may include polarizing and scattering particles that disturb a polarization direction of incident light.

In this case, the polarization direction of the incident light can be disturbed.

In the display device according to an embodiment of the present disclosure, a haze value of the optical layer may be equal to or smaller than 10%, and a depolarization factor of the optical layer may be equal to or larger than 0.02.

In this case, the viewability of the image and the mirror image is inhibited from being lowered, and unevenness in display can be suppressed more successfully.

In the display device according to an embodiment of the present disclosure, the display device may be adapted to be mounted in a vehicle, and a direction of an absorption axis of the polarization plate may be aligned with a horizontal direction of the vehicle.

In this case, the polarization plate absorbs the S-polarization component of outside light so that glare is suppressed, and the viewability of the image and the mirror image can be improved.

In the display device according to an embodiment of the present disclosure, the reflective polarization plate may include a first wave plate, a circular polarization reflection layer, and a second wave plate arranged in a stated order along the third direction when viewed from the side of the display panel, the first wave plate may transform a component of light incident on the first wave plate polarized in the first direction into a component circularly polarized in a first rotational direction and transmit resultant light, the circular polarization reflection layer may transmit a component circularly polarized in the first rotational direction and reflect a component circularly polarized in a second rotational direction opposite to the first rotational direction, in light incident on the circular polarization reflection layer, and the second wave plate may transform a component of light incident on the second wave plate circularly polarized in the first rotational direction into a component polarized in the first direction and transmit the resultant light.

In this case, the reflected light produced by the reflection of incident outside light on the first wave plate is not transmitted through the circular polarization reflection layer when an image is displayed. Accordingly, the ghost from the reflected light is more successfully inhibited from being viewed.

The display device according to an embodiment of the present disclosure may further include a transparent bonding layer that bonds the reflective polarization plate and the display panel.

In this case, the interface between the reflective polarization plate and the air and the interface between the display panel and the air can be eliminated. Therefore, reflection of outside light on the display panel can be reduced when an image is displayed.

In the display device according to an embodiment of the present disclosure, the display panel may include a liquid crystal layer, and a linear polarization plate may not be disposed between the reflective polarization plate and the liquid crystal layer.

In this case, the linear polarization plate of the display panel can be eliminated.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is a Continuation of International Application No. PCT/JP2019/012594, filed on Mar. 25, 2019, which in turn claims the benefit of Japanese Application No. 2018-064472, filed on Mar. 29, 2018, the disclosures of which Applications are incorporated by reference herein.

What is claimed is:

1. A display device comprising:
a display panel, a reflective polarization plate, a polarization control panel, a polarization plate, and an optical layer arranged in a stated order along a third direction, which is one of a first direction, a second direction, and the third direction that intersect each other, wherein
the reflective polarization plate transmits a component polarized in the first direction and reflects a component polarized in the second direction, in light incident on the reflective polarization plate,
the polarization control panel is switchable between a first state in which light incident on the polarization control panel has its polarization direction changed and is transmitted accordingly and a second state in which the incident light has its polarization direction maintained and is transmitted accordingly,
the polarization plate transmits a component polarized in the first direction or a component polarized in the second direction, in light incident on the polarization plate, and
the optical layer includes polarizing and scattering particles that disturb a polarization direction of light incident on the optical layer and transmits the light accordingly.

2. The display device according to claim 1, wherein
a haze value of the optical layer is equal to or smaller than 10%, and
a depolarization factor of the optical layer is equal to or larger than 0.02.

3. The display device according to claim 2, wherein
the reflective polarization plate includes a first wave plate, a circular polarization reflection layer, and a second wave plate arranged in a stated order along the third direction when viewed from the side of the display panel,
the first wave plate transforms a component of light incident on the first wave plate polarized in the first direction into a component circularly polarized in a first rotational direction and transmits resultant light,
the circular polarization reflection layer transmits a component circularly polarized in the first rotational direction and reflects a component circularly polarized in a second rotational direction opposite to the first rotational direction, in light incident on the circular polarization reflection layer, and the second wave plate transforms a component of light incident on the second wave plate circularly polarized in the first rotational direction into a component polarized in the first direction and transmits the resultant light.

4. The display device according to claim 1, wherein
the display device is adapted to be mounted in a vehicle, and
a direction of an absorption axis of the polarization plate is aligned with a horizontal direction of the vehicle.

5. The display device according to claim 1, wherein
the reflective polarization plate includes a first wave plate, a circular polarization reflection layer, and a second wave plate arranged in a stated order along the third direction when viewed from the side of the display panel,
the first wave plate transforms a component of light incident on the first wave plate polarized in the first direction into a component circularly polarized in a first rotational direction and transmits resultant light,
the circular polarization reflection layer transmits a component circularly polarized in the first rotational direction and reflects a component circularly polarized in a second rotational direction opposite to the first rotational direction, in light incident on the circular polarization reflection layer, and
the second wave plate transforms a component of light incident on the second wave plate circularly polarized in the first rotational direction into a component polarized in the first direction and transmits the resultant light.

6. The display device according to claim 1, further comprising a transparent bonding layer that bonds the reflective polarization plate and the display panel.

7. The display device according to claim 1, wherein
the display panel includes a liquid crystal layer, and
a linear polarization plate is not disposed between the reflective polarization plate and the liquid crystal layer.

8. A display device comprising:
a display panel, a reflective polarization plate, a polarization control panel, a polarization plate, and an optical layer arranged in a stated order along a third direction, which is one of a first direction, a second direction, and the third direction that intersect each other, wherein
the reflective polarization plate transmits a component polarized in the first direction and reflects a component polarized in the second direction, in light incident on the reflective polarization plate,
the polarization control panel is switchable between a first state in which light incident on the polarization control panel has its polarization direction changed and is transmitted accordingly and a second state in which the incident light has its polarization direction maintained and is transmitted accordingly,
the polarization plate transmits a component polarized in the first direction or a component polarized in the second direction, in light incident on the polarization plate, and
the optical layer disturbs a polarization direction of light incident on the optical layer and transmits the light accordingly,
the reflective polarization plate includes a first wave plate, a circular polarization reflection layer, and a second wave plate arranged in a stated order along the third direction when viewed from the side of the display panel,
the first wave plate transforms a component of light incident on the first wave plate polarized in the first direction into a component circularly polarized in a first rotational direction and transmits resultant light,
the circular polarization reflection layer transmits a component circularly polarized in the first rotational direction and reflects a component circularly polarized in a second rotational direction opposite to the first rotational direction, in light incident on the circular polarization reflection layer, and
the second wave plate transforms a component of light incident on the second wave plate circularly polarized in the first rotational direction into a component polarized in the first direction and transmits the resultant light.

9. The display device according to claim 8, wherein
the optical layer includes an optical film having retardation of 3000 nm-15000 nm.

10. The display device according to claim 9, wherein
the optical film is a stretched film, and
an angle formed by an absorption axis of the polarization plate and a direction of stretch of the optical film is about 45°.

11. The display device according to claim 8, wherein
the optical layer includes a retardation film that is a stretched film, and
an angle formed by an absorption axis of the polarization plate and a direction of stretch of the retardation film is about 45°.

12. The display device according to claim 8, further comprising a transparent bonding layer that bonds the reflective polarization plate and the display panel.

13. The display device according to claim 8, wherein
the display panel includes a liquid crystal layer, and
a linear polarization plate is not disposed between the reflective polarization plate and the liquid crystal layer.

14. The display device according to claim 8, wherein
the display device is adapted to be mounted in a vehicle, and
a direction of an absorption axis of the polarization plate is aligned with a horizontal direction of the vehicle.

* * * * *